United States Patent [19]
Ramsey

[11] 3,800,135
[45] Mar. 26, 1974

[54] FIBER OPTIC DISPLAY PANEL ILLUMINATOR

[75] Inventor: Charles W. Ramsey, Niles, Ohio

[73] Assignee: General Motors Corporation, Detroit, Mich.

[22] Filed: June 11, 1973

[21] Appl. No.: 369,096

[52] U.S. Cl............ 240/8.16, 240/1 LP, 240/1 EL, 350/96 B
[51] Int. Cl.............................................. B60q 3/04
[58] Field of Search.............. 240/8.16, 1 LR, 1 EL; 40/130 K; 350/96 R, 96 B

[56] References Cited
UNITED STATES PATENTS
3,131,690   5/1964   Innis et al. .......................... 240/8.16
3,718,814   2/1973   Van Slyke........................... 240/8.16

Primary Examiner—Samuel S. Matthews
Assistant Examiner—E. M. Bero
Attorney, Agent, or Firm—Warren D. Hill

[57] ABSTRACT

A display panel such as an automobile instrument panel is formed with a reflectively coated concave depression in an area where illumination of a legend or other device is required. The depression is slotted to afford insertion of a fiber optic ribbon which extends through the depression, which ribbon is remotely energized by a lamp to illuminate the depression. A clear plastic envelope for supporting the ribbon within the depression is assembled to the ribbon and the assembly is inserted into the slot from the rear of the instrument panel such that the slot holds the supporting envelope in place. A plurality of resilient tabs on the envelope engage the depression adjacent the slot to prevent removal of the assembly from the depression. An applique bearing a translucent legend or design covers the illuminated depression.

3 Claims, 3 Drawing Figures

PATENTED MAR 26 1974 3,800,135

FIBER OPTIC DISPLAY PANEL ILLUMINATOR

This invention relates to fiber optic illumination apparatus for illuminating a display panel.

It is desired in automotive vehicles, for example, to illuminate selective portions of an instrument panel to enable the reading of information legends or to enhance the appearance of the instrument panel by producing decorative effects. Fiber optic light conductors have been employed for such purposes, however they are generally restricted to the illumination of areas having relatively small dimensions.

According to one object of the present invention, there is provided a fiber optic panel illuminator effective to illuminate a relatively large area.

Another object of the invention is to provide such a panel illuminator of very simple construction which is easily assembled without tools.

The invention is carried out by providing a remotely energizeable fiber optic ribbon, an elongated support member holding the ribbon in an area treated to allow light emission therefrom, resilient tabs outstanding from the diodes of the support member and a panel having a concave depression with a slot extending through the wall thereof such that the support member and ribbon may be assembled to the panel by insertion into the slot and being held in place by the resilient tabs which abut the wall of the depression adjacent the slot.

The above and other advantages will be made more apparent from the following specification taken in conjunction with the accompanying drawings wherein like reference numerals refer to like parts and wherein.

Figure 1:
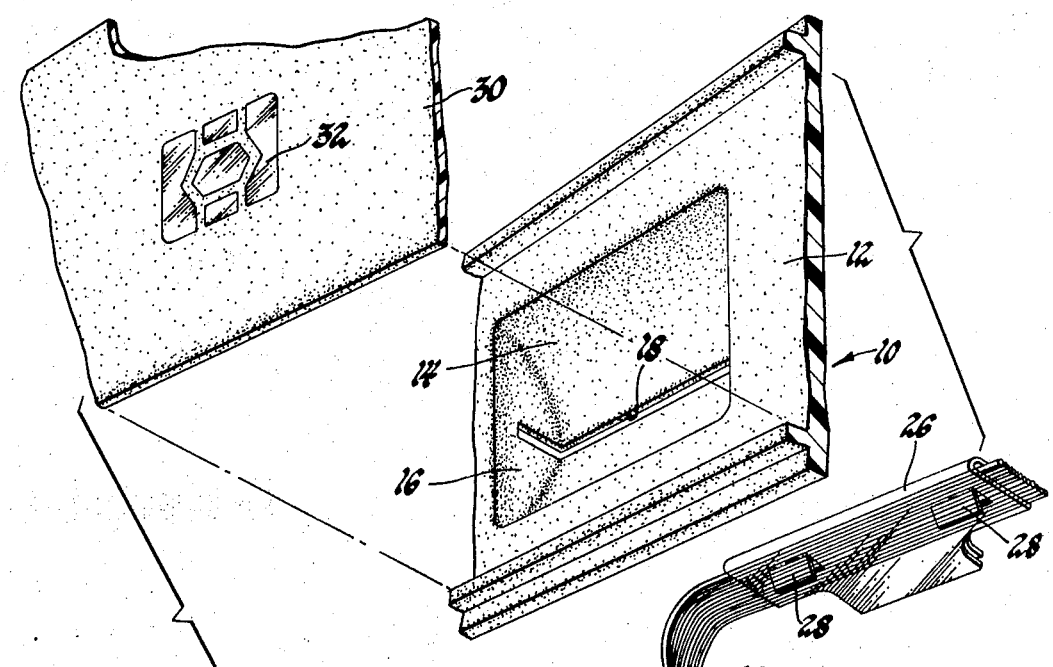
FIG. 1 is an exploded perspective view of a fiber optic illuminator for an instrument panel according to this invention.
Figure 2:
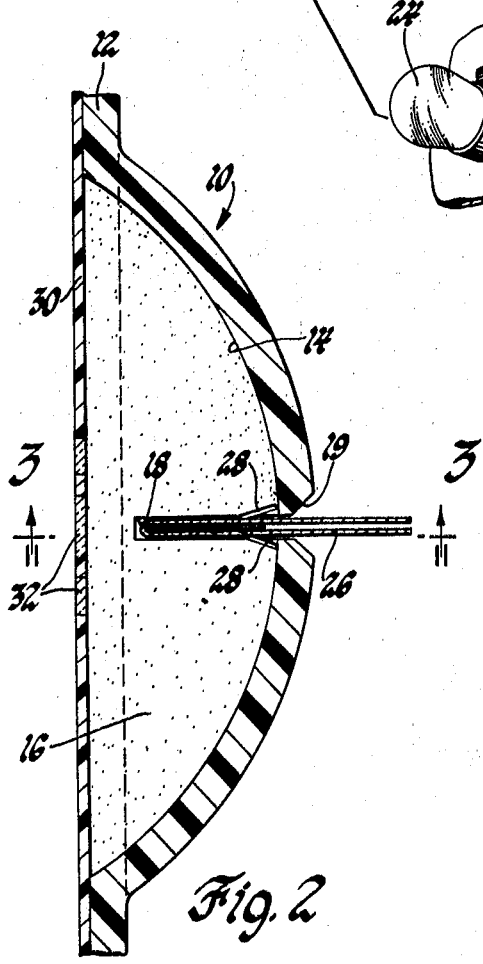
FIG. 2 is a cross-sectional view of the illuminator of FIG. 1 in assembled position.
Figure 3:
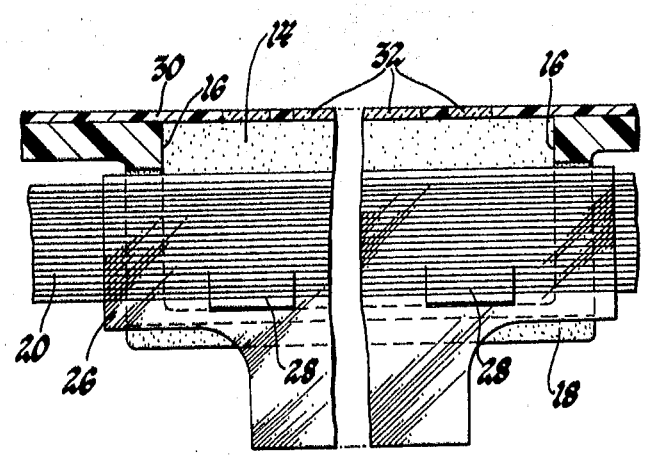
FIG. 3 is a cross-sectional view taken along line 3—3 of FIG. 2.

As shown in the drawings, a panel 10 of the type used for vehicle instrument panels is molded of plastic, for example, however the invention to be described would apply as well to a panel formed of sheet metal. The panel 10 is shown only in part and comprises a generally planar body portion 12 having formed therein a concave depression as viewed from the front of the panel which in the preferred embodiment is defined by a curved center wall 14 of generally cylindrical form and bounded on either end by end walls 16. A slot 18 is cut longitudinally through the center of the wall 14 and through the end walls 16. The wall 14 preferably is a reflective surface. Where the material of the panel 10 is inherently reflective, no special treatment of the wall 14 is required, otherwise the wall 14 is coated with glossy white paint. At the rear of the wall 14, the edges of the slot 18 are chamferred as at 19 to serve as a guide during insertion of the ribbon assembly to be described.

A fiber optic ribbon 20, as is well known in the art, comprises a parallel array of light conducting fibers assembled to form a long flat ribbon. One end of the ribbon is rolled and secured in an eyelet 22 for support by means not shown in line with a lamp 24 at some convenient location, usually in the instrument panel itself. As is also well known, light from the lamp 24 is transmitted through the ribbon 20 and may be allowed to escape laterally therefrom by abrading or otherwise treating the sides of the ribbon in any selective location to at least partially disrupt light transmission through the ribbon to allow lateral light escape.

A support member comprising clear plastic envelope 26 formed of acetate or vinyl, for example, is assembled to the ribbon 20 at a treated light emitting portion thereof to complete the ribbon assembly. The envelope 26 is formed of sheet material folded over to sandwich the ribbon 20 between its two sides. The ribbon preferably is bonded to the envelope 26 as by a clear adhesive. The envelope 26 is elongated having a length sufficient to extend beyond the end walls 16 when assembled into the slot 18, while the width of the envelope is great enough to protrude beyond the rear wall 14 to facilitate the manual assembly into the slot 18. The envelop 26 is of course sufficiently thin to fit into the slot 18, however, a number of laterally protruding resilient tabs 28 are formed in the two sides of the envelope and are so disposed that as the envelope and ribbon assembly 20, 26 is inserted into the slot 18, the tabs are compressed as they pass through the slot but then spring outwardly when they clear the slot to abut the surface of the wall 14 adjacent the slot. The tabs 28 are located, in assembly, near the end walls 16 so that they limit longitudinal shifting of the envelope 26. Thus the envelope 26 is readily assembled to the fiber optic ribbon 20 and that assembly is readily inserted by hand without special tools through the slot 18 from the rear of the panel 10. Forward removal of the envelope 26 is limited by the extent of the slot in the end wall 16 while longitudinal and rearward removal thereof is prevented by the outwardly extending resilient tabs 28.

When the lamp 24 is lit, the fiber optic ribbon 20 is energized to cause lateral light passage through the clear envelope 26 onto the reflective surface of the wall 14 thereby illuminating whatever display is placed over the front of the depression. As illustrated in the drawings, an applique member 30 bearing a translucent decorative design 32 or legend is placed over the panel 10 with the legend positioned over the illuminated depression and is secured to the panel by threaded fasteners (not shown) or adhesive bonding.

The embodiment of the invention described herein is for purposes of illustration and the scope of the invention is intended to be limited only by the following claims.

It is claimed:

1. A fiber optic illuminator for a display panel comprising a fiber optic ribbon energizeable by a light source, a portion of the ribbon being treated to permit lateral light emission, an elongated, thin translucent support means assembled to the treated portion of the ribbon, a display panel having a concave depression therein, a slot formed in the depression adapted to permit insertion of the support means, the support means being mounted within the slot with the treated portion of the ribbon positioned in the depression, and resilient tab means extending laterally from the support means to abut the depression adjacent the slot for retaining the support means in the slot.

2. A fiber optic illuminator for a display panel comprising a fiber optic ribbon energizable by a light source, a portion of the ribbon being treated to permit lateral light emission, an elongated thin translucent support means assembled to the treated portion of the ribbon, a display panel having a concave depression therein, the depression comprising a curved reflective center wall and an end wall at each end thereof, and a slot extending through the center wall and each end wall adapted to permit insertion of the support means, the support means being mounted within the slot with the treated portion of the ribbon positioned in the depression, and a plurality of resilient tabs extending laterally from the support means by an amount greater than the width of the slot and being sufficiently resilient to pass through the slot during assembly of the support means within the slot, and after assembly the tabs abutting the center wall adjacent the slot for retaining the support means in the slot.

3. A fiber optic illuminator for a display panel comprising a fiber optic ribbon energizeable by a light source, a portion of the ribbon being treated to permit lateral light emission, an elongated thin translucent support means assembled to the treated portion of the ribbon, the support means comprising a sheet of material folded into a double thickness to form an envelope with two sides, the treated portion of the ribbon being adhesively secured between the envelope sides, a display panel having a concave depression therein, the depression comprising a curved reflective center wall and an end wall at each end thereof, and a slot extending through the center wall and each end wall adapted to permit insertion of the support means, the support means being mounted within the slot with the treated portion of the ribbon positioned in the depression, and a plurality of resilient tabs extending laterally from each side of the support envelope by an amount greater than the width of the slot and being sufficiently resilient to pass through the slot during assembly of the support means within the slot, and after assembly the tabs abutting the center wall adjacent the slot for retaining the support means in the slot.

* * * * *